Dec. 16, 1947.            E. W. BERGER            2,432,717
        WASHER TYPE COMPRESSION SPRING WITH TUBULAR
               OR SHEATHLIKE ELASTIC COVERING
                      Filed Aug. 16, 1944

Inventor
Emric W. Berger
By Fred Gerlach Atty

Patented Dec. 16, 1947

2,432,717

UNITED STATES PATENT OFFICE 2,432,717

WASHER TYPE COMPRESSION SPRING WITH TUBULAR OR SHEATHLIKE ELASTIC COVERING

Emric W. Berger, San Diego, Calif., assignor to Consolidated Vultee Aircraft Corporation, San Diego, Calif., a corporation of Delaware Application August 16, 1944, Serial No. 549,727

7 Claims. (Cl. 267—1)

The present invention relates generally to compression springs. More particularly the invention relates to that type of compression spring which is characterized by an extremely high load-volumetric displacement ratio and comprises a rectilinear series of pairs of oppositely facing complemental dished or concavo-convex washers.

A compression spring of the aforementioned type is especially adapted for use as a stripping instrumentality in connection with a metal working machine, such, for example, as a power operated punch and is either mounted on a rod for washer aligning purposes or positioned loosely in a cylindrical cavity without the use of a washer aligning rod. When the washers of the spring are mounted on a rod the spring as a whole is complicated so far as design or construction is concerned and when the washers are mounted loosely in a cavity without being mounted on an aligning rod they are likely, in connection with use of the spring, to be displaced from their normal operative position with the attendant possibility of being misplaced or improperly positioned when returned to the cavity.

One object of the present invention is to provide a washer type compression spring which is an improvement upon, and has certain advantages over, conventional or standard springs by reason of the fact that it comprises in addition to the washers a sheath-like covering which is formed of elastic material, surrounds the outer peripheries of the washers, and serves to maintain the washers in alignment and proper position and also to render the spring as a whole self supporting. By employing a covering in surrounding relation with the washers it is unnecessary to employ or utilize a washer aligning rod. In addition, if the spring is positioned in a cylindrical cavity and used as a stripper or otherwise there is no likelihood of the washers becoming displaced inasmuch as the covering results in a unitary spring assembly.

Another object of the invention is to provide a washer type compression spring of the last mentioned character in which the washer surrounding covering of elastic material is applied in such manner that it is under tension when the spring is in its unloaded position and hence will not bulge or extrude outwards in connection with loading of the spring.

A further object of the invention is to provide a washer type compression spring which is generally of new and improved construction, may be manufactured at a low and reasonable cost and effectively and efficiently fulfills its intended purpose.

Other objects of the invention and the various advantages and characteristics of the present compression spring will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 1:
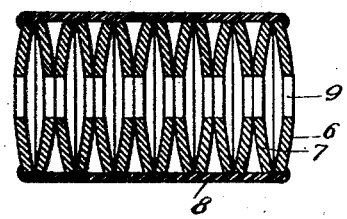
Figure 1 is a longitudinal section of a washer type compression spring embodying the invention.
Figure 2:
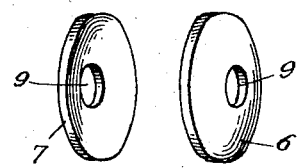
Figure 2 is a perspective view of one of the pairs of oppositely facing complemental dished or concavo-convex washers which, together with the other pairs of washers and the sheath-like covering, forms the improved spring.

The washer type spring which is shown in the drawing constitutes the preferred form or embodiment of the invention. It is of the compression variety and is particularly adapted for use as a stripping instrumentality in connection with a metal working machine, such as a power operated punch. As its component parts the spring comprises a rectilinear series of abutting pairs of oppositely facing complemental dished or concavo-convex washers 6 and 7 and a sheath-like covering 8 of elastic material. The washers are circular so far as contour or configuration is concerned and have aligned centrally disposed apertures 9. They are the same in external diameter, as shown in Figure 1, and are adapted to flatten to a limited extent when the spring is subjected to axial or longitudinal compressive forces. The washers 6 of the pairs are arranged so that their cavities face one end of the spring and the washers 7 are arranged so that their cavities face toward the other end of the spring and their outer peripheries or margins abut against the outer peripheries or margins of the washers 6. As shown in the drawing the central portions of the pairs of washers are in abutting relation and the apertures 9 are the same in diameter. The sheath-like covering 8 is formed of elastic material and surrounds the outer peripheries of the washers. It extends from one end of the spring to the other and serves to maintain the washers in alignment and proper position and also to render the spring as a whole self supporting. As hereinafter described, the covering is so applied that it is under tension. As a result of being under tension the portions between the pairs of washers will not bulge outwards when the spring is axially compressed in connection with loading thereof. Preferably the covering 8 is formed of elastic material which is resistant to, or unaffected by, oil and grease, and in connection with application of the covering to the washers will adhere to the washers as a result of possessing certain adhesive properties or characteristics. Vinyl resin having an admixture of a plasticizer constitutes an example of a suitable elastic adhesive material for the covering. The material which is known commercially as Cycleweld and is a product of Chrysler Corporation, of Detroit, Michigan, constitutes another elastic adhesive material for the covering. Such material, i. e., Cycleweld, is a thermosetting adhesive which has elastic properties when set, and possesses a high degree of adhesion to metallic surfaces. Synthetic rubber, such as neoprene, may also be used to form the covering 8.

Figure 3:
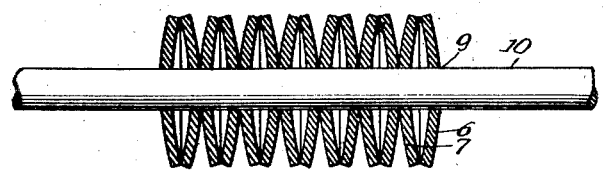
Figure 3 is a longitudinal section showing the pairs of oppositely facing washers mounted on an aligning rod preparatory to being compressed and provided with the sheath-like covering of elastic material.
Figure 4:
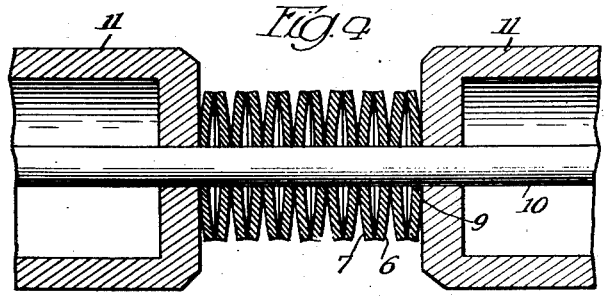
Figure 4 is a longitudinal section showing the pairs of washers after they are compressed while on the aligning rod and before application of the covering.
Figure 5:
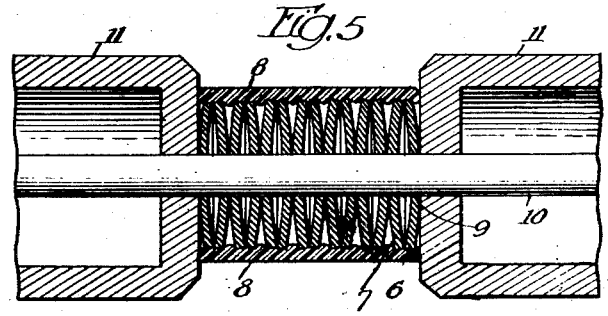
Figure 5 is a longitudinal section showing the washers in compressed form and after application of the covering therearound.

In making or fabricating the spring the washers are arranged in oppositely facing pairs and are then mounted on an aligning rod 10, as shown in Figure 3. Such rod has a diameter corresponding to the diameter of the apertures 9 in the central portions of the washers. After the pairs of washers are mounted on the aligning rod 10 tubular clamping members 11 are mounted on the ends of the rod and are then forced inwards so as to compress the washers, as shown in Figure 4. While the washers are under compression between the clamping members 11 the covering 8 of adhesive type elastic material is applied around the outer peripheries of the washers. Application of the covering to the compression washers may be effected in any well known manner as by dipping, spraying or painting. In the event the covering is applied in the latter manner, the washers are compressed to substantially their fullest extent so as to prevent the flow of the covering forming material into the spaces between the pairs of washers. If the covering is applied by a painting operation it is contemplated that the material will be brushed around the outer peripheries of the washers while it is in an uncured viscous form or condition. As an alternative the covering may be applied to the compressed washers in the form of an uncured tube. After application of the covering to the compressed washers the covering is cured and then after curing or setting of the material of which the covering 8 is formed the clamping members 11 are released and the rod 10 is removed from the spring. As soon as the clamping members are released the spring expands to its normal or unloaded position with the result that the sheath-like covering 8 is placed under tension.

The herein described compression spring effectively and efficiently fulfills its intended purpose and, due to its method of manufacture, may be produced at a low and reasonable cost. It is essentially a unitary assembly and is characterized by the fact that the washers are maintained in alignment and the spring as a whole is self supporting. Because of the fact that the spring includes the adhesive type elastic covering 8 it may be used without a washer aligning rod. In addition, if the spring is mounted in a cylindrical cavity and used as a stripping instrumentality there is no likelihood of the washers becoming displaced. Another advantage of utilizing the elastic covering 8 resides in the fact that the spring may be made of extra long length and then severed into sections of desired lengths.

The invention is not to be understood as restricted to the details set forth since these may be modified within the scope of the appended claims without departing from the spirit and scope of the invention.

Having thus described the invention, what I claim as new and desire to secure by Letters Patent is:

1. As a new article of manufacture, a compression type spring comprising a series of disc-like elements, certain of which are concavo-convex, and a tubular or sheath-like covering extending around and directly engaging the outer peripheries of the elements, formed of such elastic material that it is permitted freely to expand and contract in connection with loading and unloading of the elements, and serving yieldingly to hold said elements in place.

2. As a new article of manufacture, a compression type spring comprising a rectilinear series of washers, every other one of which is dished or cup shaped, and a tubular or sheath-like covering of adhesive type elastic material extending around and adhesively connected to the outer peripheries of the washers and serving yieldingly to hold said washers in place.

3. As a new article of manufacture, a compression type spring comprising a series of pairs of oppositely positioned concavo-convex disc-like elements, and a tubular or sheath-like covering directly extending around and engaging the outer peripheries of the elements, formed of such elastic material that it is permitted freely to expand and contract in connection with loading and unloading of the elements, and serving yieldingly to hold said elements in place.

4. As a new article of manufacture, a compression type spring comprising a rectilinear series of abutting pairs of complemental oppositely positioned concavo-convex washers, and a sheath-like covering of adhesive type elastic material extending around and adhesively connected to the outer peripheries of the washers and serving yieldingly to retain said washers in place.

5. As a new article of manufacture, a compression type spring comprising a series of disc-like elements, certain of which are concavo-convex, and a tubular or sheath-like covering of elastic material extending around and gripping the outer peripheries of the elements, arranged so that it is under tension when the spring is unloaded, and serving yieldingly to retain said elements in place.

6. As a new article of manufacture, a compression type spring comprising a series of abutting washers, every other one of which is concavo-convex, and a tubular or sheath-like covering of elastic material extending around and gripping directly the outer peripheries of the washers, arranged so that it is under tension when the spring is unloaded, and serving yieldingly to hold said washers in place.

7. As a new article of manufacture, a compression type spring comprising a rectilinear series of abutting pairs of complemental oppositely positioned concavo-convex washers, and a sheath-like covering of adhesive type elastic material extending around and adhesively connected to the outer peripheries of the washers, arranged so that it is under tension when the spring is unloaded, and serving yieldingly to retain said washers in place.

EMRIC W. BERGER.

REFERENCES CITED

The following references are of record in the file of this patent:

UNITED STATES PATENTS

| Number | Name | Date |
| --- | --- | --- |
| 28,703 | Vose | June 12, 1860 |
| 377,125 | Trent | Jan. 31, 1888 |
| 1,171,722 | Hough | Feb. 15, 1916 |
| 1,936,389 | Halliquist | Nov. 21, 1933 |
| 2,058,165 | McCoy | Oct. 20, 1936 |
| 2,162,719 | Hay | June 20, 1939 |
| 2,205,089 | Krebs | June 18, 1935 |
| 2,230,069 | Rushmore | Jan. 28, 1941 |
| 2,263,107 | Smirl | Nov. 18, 1941 |

FOREIGN PATENTS

| Number | Country | Date |
| --- | --- | --- |
| 542,580 | Great Britain | Jan. 16, 1942 |